United States Patent
Lin et al.

(10) Patent No.: US 10,057,018 B2
(45) Date of Patent: Aug. 21, 2018

(54) DRX AND HARQ OPERATIONS IN ADAPTIVE TDD SYSTEMS

(71) Applicant: MEDIATEK INC., Hsinchu (TW)

(72) Inventors: Shiang-Jiun Lin, Hsinchu (TW); Min Wu, Beijing (CN); Chien-Hwa Hwang, Hsinchu County (TW); Xiangyang Zhuang, Lake Zurich, IL (US)

(73) Assignee: MEDIATEK INC. (TW)

( * ) Notice: Subject to any disclaimer, the term of this patent is extended or adjusted under 35 U.S.C. 154(b) by 151 days.

(21) Appl. No.: 14/870,207

(22) Filed: Sep. 30, 2015

(65) Prior Publication Data

US 2016/0044708 A1 Feb. 11, 2016

Related U.S. Application Data

(63) Continuation of application No. PCT/CN2014/083714, filed on Aug. 5, 2014.

(51) Int. Cl.
*H04L 1/18* (2006.01)
*H04W 76/28* (2018.01)
(Continued)

(52) U.S. Cl.
CPC ....... *H04L 1/1861* (2013.01); *H04W 72/1289* (2013.01); *H04W 76/048* (2013.01); *H04W 76/28* (2018.02); *H04L 5/1469* (2013.01)

(58) Field of Classification Search
None
See application file for complete search history.

(56) References Cited

U.S. PATENT DOCUMENTS 10,268,003    11/2011  Li et al. ............. 370/311
8,155,067 B2  4/2012   Wang et al. ......... 370/329
(Continued)

FOREIGN PATENT DOCUMENTS

CN    101730207 A   11/2008
CN    102075993 A   1/2011
(Continued)

OTHER PUBLICATIONS

International Search Report and Written Opinion of International Search Authority for PCT/CN2014/083714 dated Oct. 27, 2014 (14 pages).
(Continued)

*Primary Examiner* — Chi H Pham
*Assistant Examiner* — Vladislav Agureyev
(74) *Attorney, Agent, or Firm* — Imperium Patent Works; Zheng Jin

(57) ABSTRACT

A method of DRX operation enhancement in adaptive TDD systems is proposed. A UE configures and enters DRX operation in an LTE/LTE-A mobile communication network. The UE obtains adaptive TDD configuration information from a base station. The adaptive TDD configuration information comprises an actual TDD configuration and a reference TDD configuration. The UE performs DRX timer counting and HARQ timer counting based on the reference TDD configuration. The UE also synchronizes DRX status with the base station. With the reference TDD configuration, it can avoid the potential misunderstanding between eNB and UE regarding DRX and HARQ RTT timing when TDD configuration changes.

20 Claims, 8 Drawing Sheets

(51) Int. Cl.
*H04W 72/12* (2009.01)
*H04W 76/04* (2009.01)
*H04L 5/14* (2006.01)

(56) References Cited

U.S. PATENT DOCUMENTS

| | | | | |
|---|---|---|---|---|
| 2008/0287091 | A1* | 11/2008 | Suzuki | H04W 76/048 455/343.4 |
| 2011/0268003 | A1 | 11/2011 | Li et al. | 370/311 |
| 2011/0305183 | A1* | 12/2011 | Hsu | H04W 72/005 370/312 |
| 2013/0223307 | A1* | 8/2013 | Ohlsson | H04W 52/0216 370/311 |
| 2013/0265928 | A1* | 10/2013 | Martinez Tarradell | H04W 28/0268 370/312 |
| 2013/0279377 | A1 | 10/2013 | Zhao et al. | 370/280 |
| 2014/0086112 | A1* | 3/2014 | Stern-Berkowitz | H04W 72/1289 370/280 |
| 2014/0269480 | A1* | 9/2014 | Han | H04W 76/048 370/311 |
| 2015/0078349 | A1* | 3/2015 | He | H04W 28/0242 370/336 |
| 2015/0098380 | A1* | 4/2015 | Tseng | H04W 76/048 370/311 |
| 2015/0173065 | A1* | 6/2015 | Fu | H04L 1/1861 370/280 |
| 2015/0289246 | A1* | 10/2015 | Suzuki | H04L 1/1851 370/329 |
| 2015/0327229 | A1 | 11/2015 | Zhang et al. | 370/280 |
| 2015/0327324 | A1* | 11/2015 | Wei | H04W 52/0235 370/280 |
| 2016/0119970 | A1* | 4/2016 | Lee | H04W 76/048 370/328 |
| 2016/0192433 | A1* | 6/2016 | Deenoo | H04W 72/046 370/329 |

FOREIGN PATENT DOCUMENTS

| | | |
|---|---|---|
| CN | 101998525 A | 3/2011 |
| CN | 102075949 A | 5/2011 |
| CN | 102075993 A | 5/2011 |
| CN | 102196540 A | 6/2011 |
| CN | 102595609 A | 7/2012 |
| CN | 103582113 A | 2/2014 |
| EP | 2157830 A1 | 2/2010 |
| EP | 2983418 A1 | 2/2016 |
| EP | 2983418 A4 * | 12/2016 ........... H04L 1/1851 |
| EP | 3016457 A4 * | 1/2017 .......... H04W 76/048 |
| WO | WO2013044432 A1 | 4/2013 |
| WO | WO 2013075651 A1 * | 5/2013 ........ H04W 52/0216 |
| WO | WO2014117323 A1 | 8/2014 |

OTHER PUBLICATIONS

International Search Report and Written Opinion of International Search Authority for PCT/CN2014/083717 dated Nov. 6, 2014 (11 pages).
EPO, Search Report for the EP patent application 14834849.3 dated Jun. 9, 2016 (7 pages).
3GPP TSG-RAN WG1 #73 R1-132024, Ericsson et al., On Efficient Signaling of Dynamic TDD, Fukuoka, Japan dated May 20-24, 2013 (3 pages).
EPO, Search Report for the EP patent application 14835191.9 dated Jun. 9, 2016 (8 pages).
3GPP TSG RAN Wg1 Meeting #72 R1-130857, Qualcomm Incorporated, Signaling Mechanisms for Reconfiguration, St. Julian's, Malta dated Jan. 28-Feb. 1, 2013 (5 pages).
3GPP TS 36.321 V11.3.0 (Jun. 2013), 3rd Generation Partnership Project; Technical Specification group Radio Access Network; Evolved Universal Terrestrial Radio Access (E-UTRA); Medium Access Control (MAC) Protocol Specification (Release 11).
USPTO, office action for the U.S. Appl. No. 14/870,244 dated Dec. 27, 2017 (16 pages).
SIPO, search report for the CN patent application 201480043417.4 (no English translation is available) dated Jun. 5, 2018 (7 pages).
R1-132022 3GPP TSG RAN WG1 Meeting #73, Ericsson et al., "Evaluation of power control based interference mitigation", Fukuoka, Japan, May 20-24, 2013.
R1-131458 3GPP TSG-RAN WG1 #72bis, Ericsson et al., "On efficient signaling of Dynamic TDD", Chicago, U.S.A., Apr. 15-19, 2013.

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

101
102

R/R/E/LCID/F/L sub-header with 7-bits L field

R/R/E/LCID/F/L sub-header with 15-bits L field

| Index | LCID values |
|---|---|
| 00000 | CCCH |
| 00001-01010 | Identity of the logical channel |
| 01011-10111 | Reserved |
| 11000 | DRX status report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

DRX AND HARQ OPERATIONS IN ADAPTIVE TDD SYSTEMS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2014/083714, with an international filing date of Aug. 5, 2014, which in turn claims priority from International Application No. PCT/CN2013/080904, filed on Aug. 6, 2013. This application is a continuation of International Application No. PCT/CN2014/083714, which claims priority from International Application No. PCT/CN2013/080904. International Application No. PCT/CN2014/083714 is pending as of the filing date of this application, and the United States is a designated state in International Application No. PCT/CN2014/083714. This application claims the benefit under 35 U.S.C. § 119 from International Application No. PCT/CN2013/080904. The disclosure of each of the foregoing documents is incorporated herein by reference.

TECHNICAL FIELD

The present invention relates generally to wireless communication systems and, more particularly, to Discontinuous Reception (DRX) operation in adaptive Time Division Duplex (TDD) systems.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each radio frame having the same frame length with the same number of subframes. The subframes are configures to perform uplink (UL) transmission or downlink (DL) reception in different Duplexing methods. Time-division duplex (TDD) is the application of time-division multiplexing to separate transmitting and receiving radio signals. TDD has a strong advantage in the case where there is asymmetry of the uplink and downlink data rates. Seven different TDD configurations are provided in LTE/LTE-A systems to support different DL/UL traffic ratios for different frequency bands.

FIG. 1 (Prior Art) illustrates the TDD mode UL-DL configurations in an LTE/LTE-A system. FIG. 1 shows that each radio frame contains ten subframes, D indicates a DL subframe, U indicates an UL subframe, and S indicates a Special subframe/Switch point (SP). Each SP contains a DwPTS (Downlink pilot time slot), a GP (Guard Period), and an UpPTS (Uplink pilot time slot). DwPTS is used for normal downlink transmission and UpPTS is used for uplink channel sounding and random access. DwPTS and UpPTS are separated by GP, which is used for switching from DL to UL transmission. The length of GP needs to be large enough to allow the UE to switch to the timing advanced uplink transmission. These allocations can provide 40% to 90% DL subframes.

In 3GPP LTE Rel-11 and after, the trend of the system design shows the requirements on more flexible configuration in the network system. Based on the system load, traffic type, traffic pattern and so on, the system can dynamically adjust its parameters to further utilize the radio resource and to save the energy. One example is the support of dynamic TDD configuration, where the TDD configuration in the system may dynamically change adapting to the DL-UL traffic ratio. When the change better matches the instantaneous traffic situation, the system throughput will be enhanced.

In traditional TDD systems, UL-DL configuration is broadcasted in the system information, i.e. SIB1. The mechanism for adapting UL-DL allocation is based on the system information change procedure. The semi-static allocation may or may not match the instantaneous traffic situation. In adaptive TDD systems, the notification of TDD change may be sent through a dedicated signaling, i.e., Radio Resource Control (RRC), Media Access Control (MAC) or Physical Downlink Control Channel (PDCCH) signaling, where the change period may be much less than the change of SIB1 (640 ms). The benefits to adopt TDD configuration change by dedicated signaling is that it can be adjusted more efficiently and frequently to match the instantaneous traffic pattern.

In order to enable reasonable UE battery consumption, discontinuous reception (DRX) in E-UTRAN is defined. The UE may be configured via RRC with a DRX functionality that controls the UE's PDCCH monitoring activity for the UE's C-RNTI, TPC-PUCCH-RNTI, TPC-PUSCH-RNTI and Semi-Persistent Scheduling C-RNTI (if configured). When in RRC CONNECTED mode, if DRX is configured, the UE is allowed to monitor the PDCCH discontinuously using the DRX operation. Otherwise, the UE monitors the PDCCH continuously. The DRX parameters are configured by eNodeB, a trade-off between UE battery saving and latency reduction of data transmission.

FIG. 2 (Prior Art) illustrates a DRX Cycle where the periodic repetition of the On Duration followed by a possible period of inactivity. The following definitions may apply to DRX in E-UTRAN: 1) on-duration: a duration in downlink subframes that the UE waits for, after waking up from DRX, to receive PDCCHs. If the UE successfully decodes a PDCCH, the UE stays awake and starts the inactivity timer; 2) inactivity-timer: a duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions); 3) active-time: the total duration that the UE is awake. This includes the "on-duration" of the DRX cycle, the time UE is performing continuous reception while the inactivity timer has not expired and the time UE is performing continuous reception while waiting for a DL retransmission after one HARQ RTT. Based on the above, the minimum active time is of length equal to on-duration, and the maximum is undefined.

More specifically, when a DRX cycle is configured, the Active Time includes the time while 1) onDurationTimer or drx-InactivityTimer or drx-RetransmissionTimer or mac-ContentionResolutionTimer is running; 2) a Scheduling Request is sent on PUCCH and is pending; 3) an uplink grant for a pending HARQ retransmission occurs and there is data in the corresponding HARQ buffer; or 4) a PDCCH indicating a new transmission addressed to the C-RNTI of the UE has not been received after successful reception of a Random Access Response for the preamble not selected by the UE. The DRX timers and HARQ RTT timer are all counted in PDCCH subframe, which may cause problems in adaptive TDD systems because frequent TDD configuration changes may lead to non-alignment counting in PDCCH subframe in eNodeB and UE sides. DRX operations in adaptive TDD systems thus need to be enhanced.

SUMMARY

Solutions on DRX timers and HARQ RTT timer counting in adaptive TDD systems are proposed in the embodiments of this invention. Several scenarios and the corresponding solutions are discussed.

In one embodiment, the onDurationTimer, drx-InactivityTimer and drx-RetransmissionTimer can be counted in PDCCH subframe of the actual TDD configuration. eNodeB and UE should count the PDCCH subframe according to the new TDD configuration when TDD configuration change applies. The HARQ RTT timer can be determined by Table 2 or the HARQ RTT timer can be set as k'+4 where k' is the interval between the downlink transmission and the transmission of associated HARQ feedback in the combination of old TDD configuration and new TDD configuration. In one example, k' can be determined by predefined rules. In another example, k' can be the number of subframes between a previous downlink transmission and a subsequent nearest uplink transmission for HARQ feedback, wherein k' is greater or equal to four.

In another embodiment, if DL reference configuration is used as the reference configuration of PDCCH subframe counting, the onDurationTimer, drx-InactivityTimer and drx-RetransmissionTimer are counted based on the PDCCH subframes in DL reference configuration. The HARQ RTT timer per DL HARQ process should also count according to the DL reference configuration. In one example, the DL reference configuration is with the most schedulable DL subframes.

In another embodiment, if UL reference configuration is used as the reference configuration of PDCCH subframe counting, the onDurationTimer, drx-InactivityTimer and drx-RetransmissionTimer are counted based on the PDCCH subframes in UL reference configuration. However, the HARQ RTT timer per DL HARQ process should still count according to the DL reference configuration. In one example, the UL reference configuration is with the most schedulable UL subframes.

In another embodiment, the TDD configuration broadcasted in SIB1 can be used as reference configuration of PDCCH subframe counting. The onDurationTimer, drx-InactivityTimer and drx-RetransmissionTimer are counted based on the PDCCH subframes in SIB1 TDD configuration. The HARQ RTT timer per DL HARQ process should also count according to the SIB1 TDD configuration. In one example, UL reference configuration is broadcasted in SIB1 as the reference configuration.

In yet another embodiment, the onDurationTimer, drx-InactivityTimer, and drx-RetransmissionTimer are counted in subframe basis (instead of PDCCH subframe counting) regardless of TDD configuration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figures 1, 2:
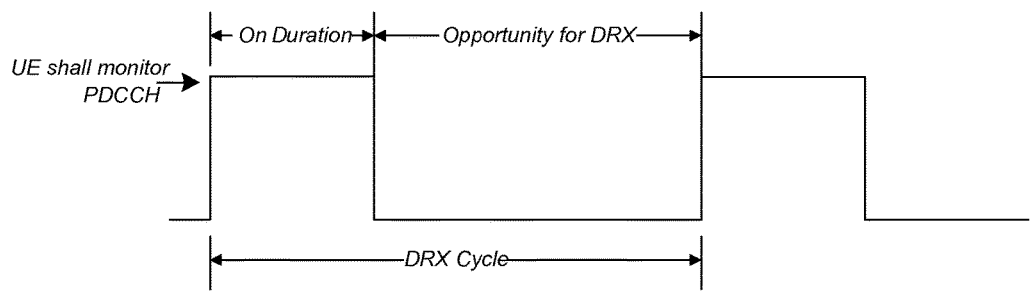
FIG. 1 (Prior Art) illustrates the TDD mode UL-DL configurations in an LTE/LTE-A system.
FIG. 2 (Prior Art) illustrates an LTE/LTE-A mobile communication system with adaptive TDD configuration.
Figure 3:
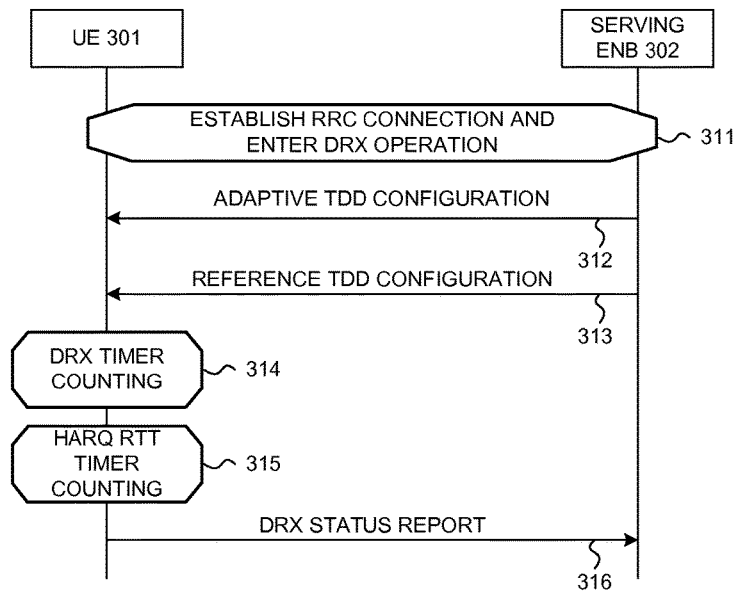
FIG. 3 illustrates an LTE/LTE-A mobile communication system with adaptive TDD configuration and DRX operation in accordance with one novel aspect.

FIG. 3 illustrates an overview of LTE/LTE-A mobile communication system 300 with adaptive TDD configuration and DRX operation in accordance with one novel aspect. LTE system 300 comprises a user equipment UE 301 and a serving base station eNB 302. In step 311, UE 301 establishes a radio resource control (RRC) connection with eNB 302 and is configured to enter discontinuous reception (DRX) operation for power saving purpose. The LTE system supports adaptive time division duplex (TDD) configuration, where the TDD configuration in the system may dynamically change according to the downlink-uplink (DL-UL) traffic ratio. The traditional mechanism for adapting UL-DL allocation is based on the system information change procedure (e.g., broadcasting TDD configuration via SIB1). However, since TDD configuration may change frequently (e.g., TDD configuration switch is 10 ms most frequently), UE behavior may be impacted if the TDD change is not sent to UEs in time (e.g., SIB1 is updated at least 640 ms). In adaptive TDD systems, the notification of TDD change may be sent through a dedicated signaling, i.e., RRC, MAC or PDCCH signaling, where the change period may be much less than the change of SIB1 (640 ms). The benefits to adopt TDD configuration change by dedicated signaling is that it can be adjusted more efficiently and frequently to match the instantaneous traffic pattern.

In DRX operation, the various DRX timers including onDurationTimer, drx-InactivityTimer, and drx-RetransmissionTimer are counted in PDCCH subframes. However, in adaptive TDD operation, since the TDD configurations may change frequently, UE may not know or may lose the knowledge of the actual TDD configuration even with dedicated signaling. In such a case, the PDCCH subframe counting may not be aligned between eNB and UE sides so that the active state and inactive state for DRX operation may not be aligned in eNB and UE sides. If the counting of these timers does not match, then it is possible that UE is awake but Network does not transmit anything or Network transmits data for the UE but UE is in inactive mode. In the former case, unnecessary PDCCH monitoring occurs in the non-alignment area and results in UE power consumption. In the latter case, data would be missed in the UE side and retransmission is expected, which results in radio resource waste.

In accordance with one novel aspect, solutions to support the DRX operations in adaptive TDD systems are proposed. In step 312, UE 301 obtains adaptive TDD configuration information from eNB 302. In step 313, UE 301 also obtains reference TDD configuration information from eNB 302. Based on the obtained information, UE 301 performs DRX timer counting and HARQ RTT timer counting in steps 314 and 315. Finally, in step 316, UE 301 sends a DRX status report to eNB 302 such that the DRX status is synchronized. In addition, UE 301 may obtain updated TDD configuration from eNB 302.

Figure 4:
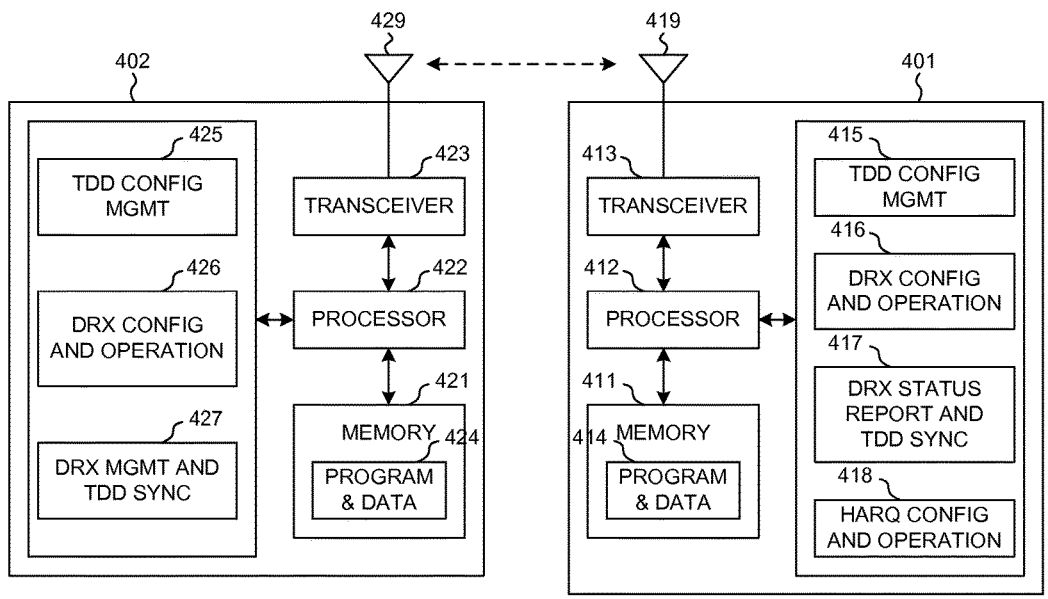
FIG. 4 is a simplified block diagram of a user equipment and a base station with DRX operation in adaptive TDD systems in accordance with one novel aspect.

FIG. 4 is a simplified block diagram of a user equipment UE 401 and a base station eNB 402 with DRX operation in adaptive TDD systems in accordance with one novel aspect. UE 401 comprises memory 411, a processor 412, an RF transceiver 413, and an antenna 419. RF transceiver 413, coupled with antenna 419, receives RF signals from antenna 419, converts them to baseband signals and sends them to processor 412. RF transceiver 413 also converts received baseband signals from processor 412, converts them to RF signals, and sends out to antenna 419. Processor 412 processes the received baseband signals and invokes different functional modules to perform features in UE 401. Memory 411 stores program instructions and data 414 to control the operations of UE 401. The program instructions and data 414, when executed by processor 412, enables UE 401 to access a mobile communication network for receiving adaptive TDD configuration information, and performing DRX operation accordingly.

UE 401 also comprises various function modules including a TDD configuration management module 415 that performs actual and/or reference TDD configurations, a DRX configuration and operation module 416 that performs DRX configuration and operation, a DRX status report and TDD synchronization module 417 that sends DRX status report and receives TDD configuration synchronization, and an HARQ configuration and operation module 418 that performs HARQ configuration and operation for HARQ process and timer counting. The different components and modules may be implemented in a combination of hardware circuits and firmware/software codes being executable by processor 412 to perform the desired functions. Similarly, eNB 402 comprises memory 421, a processor 422, a transceiver 423 coupled to one or multiple antennas 429, and eNB 402 also comprises various function modules including a TDD configuration management module 425 that configures actual and/or reference TDD configurations to UE, a DRX configuration and operation module 426 that performs DRX configuration and operation, and a DRX management and TDD synchronization module 427 that receives DRX status report from UE and sends TDD configuration synchronization to UE. Both eNB and UE communicate with each other via a layered protocol stack including various protocols layers such as PHY, MAC, RLC, PDCP, RRC, and NAS.

When a DRX cycle is configured, the Active Time—the total duration that the UE is awake—includes the "On Duration" of the DRX cycle, the time UE is performing continuous reception while the inactivity timer has not expired, and the time UE is performing continuous reception while waiting for a DL retransmission after one HARQ RTT. More specifically, the Active Time includes the time while 1) onDurationTimer or drx-InactivityTimer or drx-RetransmissionTimer or mac-ContentionResolutionTimer is running; 2) a Scheduling Request is sent on PUCCH and is pending; 3) an uplink grant for a pending HARQ retransmission occurs and there is data in the corresponding HARQ buffer; or 4) a PDCCH indicating a new transmission addressed to the C-RNTI of the UE has not been received after successful reception of a Random Access Response for the preamble not selected by the UE. Among which, the timers running in Active Time are depicted in FIGS. 5A-5C.

Figure 5A:
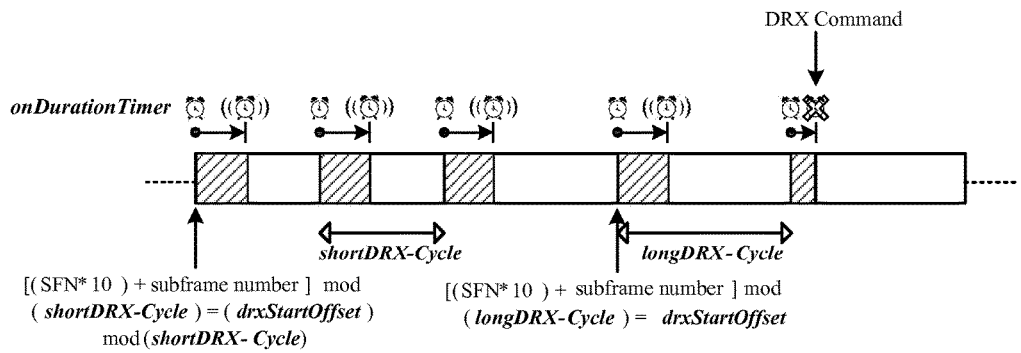
FIG. 5A illustrates DRX onDurationTimer and relationship to PDCCH subframe counting.

FIG. 5A illustrates onDurationTimer. The OnDurationTimer defines a duration in downlink subframes that the UE waits for after waking up from DRX to receive PDCCHs. If the UE successfully decodes a PDCCH, the UE stays awake and starts the inactivity timer. The onDurationTimer specifies the number of consecutive PDCCH-subframes at the beginning of a DRX cycle (value in number of PDCCH subframes). The On Duration starts upon the start subframe according to drxStartOffset, and stops upon the onDurationTimer is expired or when a DRX command MAC control element is received.

Figure 5B:
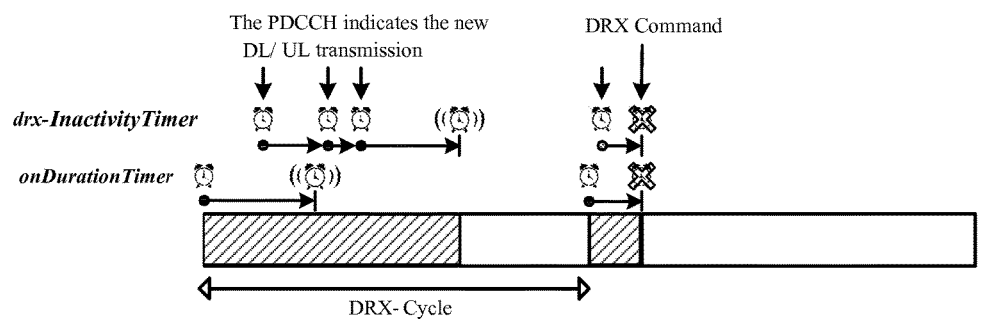
FIG. 5B illustrates drx-InactivityTimer and relationship to PDCCH subframe counting.

FIG. 5B illustrates drx-InactivityTimer, which defines a duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only. The drx-InactivityTimer specifies the number of consecutive PDCCH-subframes after successfully decoding a PDCCH indicating an initial UL or DL user data transmission for this UE (value in number of PDCCH subframes). The inactivity time duration starts or restarts upon the PDCCH indicates a new transmission (DL or UL), which does not include SPS transmission, and regardless of whether DL data is decoded successfully or not. The inactivity time duration stops upon the timer expires or when a DRX command MAC control element is received.

Figure 5C:
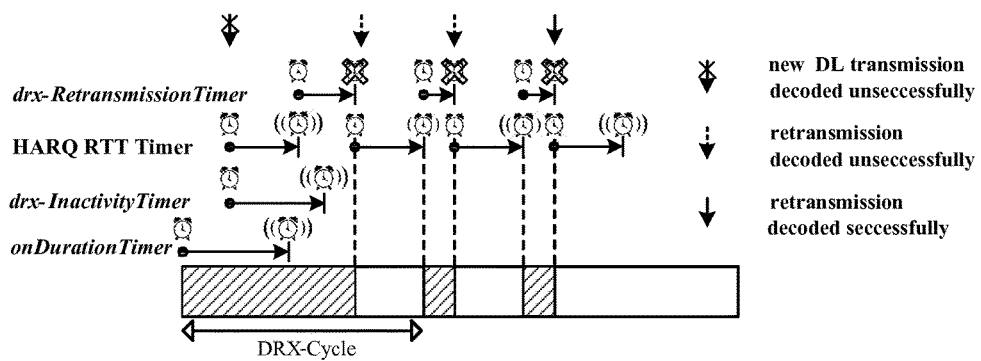
FIG. 5C illustrates drx-RetransmissionTimer and HARQ RTT timer.

FIG. 5C illustrates drx-RetransmissionTimer and HARQ RTT timer. Drx-RetransmissionTimer specifies the maximum number of consecutive PDCCH-subframes for as soon as a DL retransmission is expected by the UE (value in number of PDCCH subframes). The drx-RetransmissionTimer starts if a HARQ RTT timer expires in this subframe and the data in the soft buffer of the corresponding HARQ process was not successfully decoded. The drx-RetransmissionTimer stops if the PDCCH indicates a DL transmission or if a DL assignment has been configured for this subframe during Active Time. Another DRX timer (not shown) is the mac-ContentionResolutionTimer, which specifies the number of consecutive subframes during which the UE shall monitor the PDCCH after Msg3 is transmitted.

There is one HARQ RTT timer and one drx-RetransmissionTimer per DL HARQ process (except for broadcast process). During Active Time, for a PDCCH-subframe, for example, if the subframe is not part of a configured measurement gap, and if the PDCCH indicates a DL transmission or if a DL assignment has been configured for this subframe, then UE will start the HARQ RTT Timer for the corresponding HARQ process. In FDD, HARQ RTT timer is eight subframes. In TDD, the duration of HARQ RTT Timer is set to k+4 subframes, where k is the interval between the downlink transmission and the transmission of associated HARQ feedback. Table 2 shows the HARQ RTT Timer value in each TDD configuration. In Table 2, the first parameter is k, which means given a DL transmission in a subframe, after k subframe, UE should feedback ACK/NACK to eNB. The second parameter, (k+4), is the HARQ RTT timer. For example, if a UE receives a DL new transmission in subframe 0 of TDD configuration #2, then the UE should feedback ACK/NACK in subframe 0+7 (k=7), and the HARQ RTT timer should set as k+4=7+4=11. As a result, the HARQ RTT timer should count down 11 subframes. Note that whether HARQ RTT timers are running or not does not affect Active Time determination.

example, eNB configures TDD configurations from configuration #0 to #6 to #1 per radio frame basis, and both eNB and UE know it well, so that the three DRX timers counted in PDCCH subframes can be counted according to the TDD configuration #0, #6 and #1 and it should be 4, 5, and 6 PDCCH subframes, respectively.

Figure 6A:
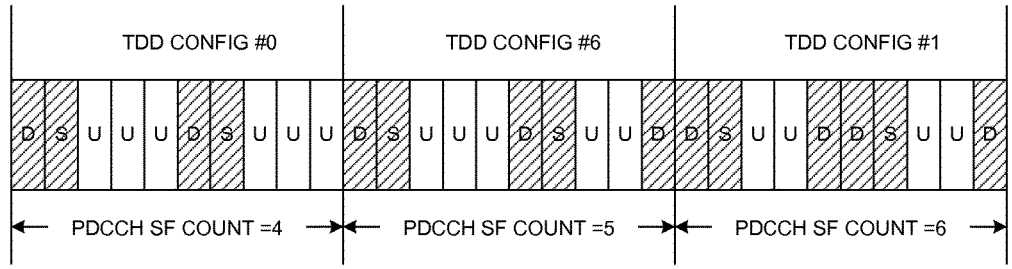
FIG. 6A illustrates examples of different TDD configurations and relationship to DRX timers.
Figure 6B:
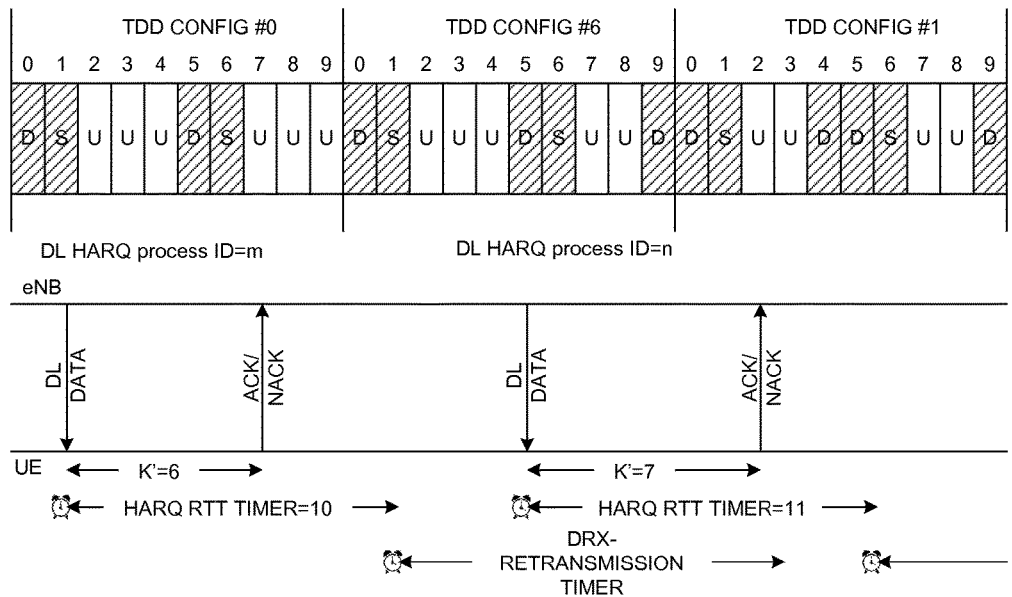
FIG. 6B illustrates examples of different TDD configurations and corresponding operation procedure of different timers.

FIG. 6B illustrates examples of different TDD configurations and corresponding operation procedure of different timers. In a first embodiment, the HARQ RTT timer can be determined by Table 2 depending on which subframe in which configuration where the PDCCH indicates a DL transmission or a DL assignment has been configured. In a second embodiment, the HARQ RTT timer can be set as k'+4, where k' is the interval between the downlink transmission and the transmission of associated HARQ feedback in the combination of old TDD configuration and new TDD configuration. In a first example, k' can be determined by a pre-defined rule. In a second example, k' can be defined as the interval between the downlink transmission and the nearest uplink subframe to carry the transmission of the associated HARQ feedback which should be greater than or equal to 4 subframes of the downlink transmission subframe no matter in what combinations of TDD configuration

TABLE 2 k/HARQ RTT timers (k + 4)

| Uplink-downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4/8 | 6/10 | | | | 4/8 | 6/10 | | | |
| 1 | 7/11 | 6/10 | | | 4/8 | 7/11 | 6/10 | | | 4/8 |
| 2 | 7/11 | 6/10 | | 4/8 | 8/12 | 7/11 | 6/10 | | 4/8 | 8/12 |
| 3 | 4/8 | 11/15 | | | | 7/11 | 6/10 | 6/10 | 5/9 | 5/9 |
| 4 | 12/16 | 11/15 | | | 8/12 | 7/11 | 7/11 | 6/10 | 5/9 | 4/8 |
| 5 | 12/16 | 11/15 | | 9/13 | 8/12 | 7/11 | 6/10 | 5/9 | 4/8 | 13/17 |
| 6 | 7/11 | 7/11 | | | | 7/11 | 7/11 | | | 5/9 |

PDCCH-subframe refers to a subframe with PDCCH. For full-duplex TDD, PDCCH-subframe represents the union of downlink subframes and subframes including DwPTS of all serving cell, except serving cells that are configured with scheduled cell ID. For half-duplex TDD, PDCCH-subframe represents the subframes where the PCELL is configured as a downlink subframe or a subframe including DwPTS. It can been seen that in DRX operation, onDurationTimer, drx-InactivityTimer, and drx-RetransmissionTimer are counted in PDCCH subframes. However, in adaptive TDD operations, since the TDD configurations may change frequently, UE may not know or may lose the knowledge of the actual TDD configuration. In such a case, the PDCCH subframe counting may not be aligned between eNB and UE sides so that the active state and inactive state for DRX operation may not be aligned in eNB and UE sides. Various solutions to support the DRX operations in adaptive TDD systems are now described with accompanying drawings.

In a first scenario, PDCCH subframe counting is based on the actual TDD configuration. If eNB signals the actual TDD configuration to UE and both eNB and UE know when to apply the new TDD configuration, then the onDurationTimer, drx-InactivityTimer, or drx-RetransmissionTimer can be counted in PDCCH subframes of the actual TDD configuration. Both eNB and UE should count the PDCCH subframes according to the new TDD configuration when TDD configuration change applies.

FIG. 6A illustrates examples of different TDD configurations and their relationship to DRX timers. In this changes (old TDD configuration and new TDD configuration). After determining k', the duration of the HARQ RTT Timer is set to k'+4 subframes.

As illustrated in FIG. 6B, in one example, a DL data transmission is scheduled by an eNB to a UE in SF #1 in TDD configuration #0 with DL HARQ Process ID=m. The HARQ feedback according to the rule: the nearest uplink subframe greater than or equal to 4 subframes of the downlink transmission should be transmitted in SF #7 in TDD configuration #0. In this case, k' is set to 6 and the HARQ RTT timer should be set to 10. After HARQ RTT timer expires in a subframe, if the data in the soft buffer of the corresponding HARQ process was not successfully decoded, the DRX-Retransmission timer for the corresponding HARQ process should be started. In another example, a DL data transmission is scheduled by an eNB to a UE in SF #5 in TDD configuration #6 with DL HARQ Process ID=n. The following TDD configuration in the next radio frame is TDD configuration #1. Thus, the HARQ feedback according to the rule should be transmitted in SF #2 in TDD configuration #1. k' in this case is set to 7 and the HARQ RTT timer should be set to 11. After HARQ RTT timer expires in a subframe, if the data in the soft buffer of the corresponding HARQ process was not successfully decoded, the DRX-Retransmission timer for the corresponding HARQ process should be started.

In a second scenario, PDCCH subframe counting is based on a reference configuration. The reference configuration can be either a downlink reference configuration or an uplink reference configuration. In order to deal with the HARQ feedback in the transition of TDD configuration changes, eNB may schedule a DL reference configuration and an UL reference configuration to adaptive-TDD-enabled UEs. The DL reference configuration is with the most schedulable DL subframes and is used to indicate the UL HARQ reference timing (the timing where UE sends HARQ feedback for the DL transmission to eNB), while the UL reference configuration is with the most schedulable UL subframes and is used to indicate the DL HARQ reference timing (the timing where UE expects HARQ feedback for the UL transmission from eNB). The TDD configuration relationship of DL reference configuration, scheduling configuration and UL reference configuration should follow equation (1):

$$\begin{array}{c} \text{DL subframe set} \\ \text{in UL reference configuration} \end{array} \subseteq \\ \begin{array}{c} \text{DL subframe set} \\ \text{in scheduling configuration} \end{array} \subseteq \\ \begin{array}{c} \text{DL subframe set} \\ \text{in DL reference configuration} \end{array} \quad (1)$$

where the DL subframe set includes DL subframes and special subframes.

With DL and UL reference configuration, eNB should explicitly configure a cell specific DL reference configuration and a cell specific UL reference configuration to adaptive-TDD-enabled UEs. One example is to signal the DL and UL reference configuration to UE through system information or through RRC signaling. For example, to prevent the legacy UEs and the UEs that do not know the exact scheduling TDD configuration to perform incorrect measurement on a subframe which is broadcasted in SIB1 as DL but is turned to be operated as UL, the TDD configuration broadcasted in the SIB1 should be an UL reference configuration, which is with the less DL subframes or in other words, is with the most UL subframes. The DL reference configuration can also be broadcasted in the SIB1 with extended information element. The change of DL and UL reference configurations can be done through system information change procedure.

Another example is to configure the DL and UL reference configurations through dedicated signaling. For example, the DL and UL reference configurations can be configured to an adaptive-TDD-enabled UE through RRC signaling. The change of DL and UL reference configurations can be done through RRC connection reconfiguration. Another example is to broadcast the UL reference configuration in SIB1 TDD configuration, and to signal the DL reference configuration by dedicated signaling. The change of UL reference configurations can be done through system information change procedure and the change of DL reference configuration should be done through RRC connection reconfiguration.

Once the adaptive-TDD-enabled UE obtains the DL and UL reference configuration, the UE knows the UL HARQ feedback timing and the DL HARQ receiving timing according to the DL and UL reference configurations, respectively. The actual TDD configuration for scheduling should follow the DL subframe set relationship according to equation (1). DL and UL reference configurations are expected to change semi-statically. With the DL and UL reference configurations, it can avoid the potential misunderstanding between eNB and UE regarding HARQ timing when TDD configuration changes.

Figure 7:
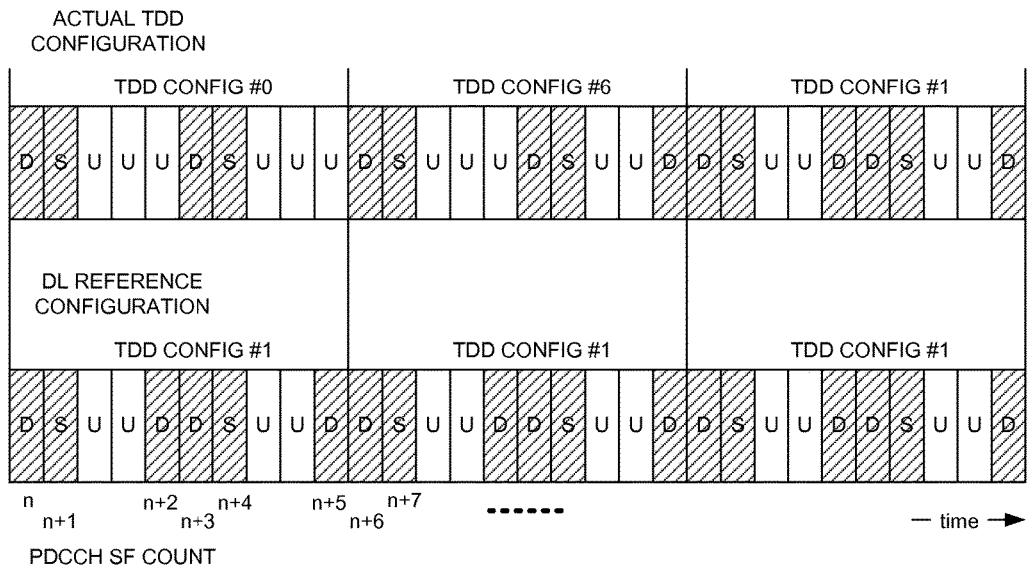
FIG. 7 illustrates an example of downlink (DL) reference configuration.

FIG. 7 illustrates an example of DL reference configuration. Since the reference configurations are changed less frequently, they can be used as the reference of PDCCH subframe counting for those DRX timers counted in PDCCH subframe. That is, no matter what the actual TDD configuration is, the onDurationTimer, drx-InactivityTimer and drx-RetransmissionTimer are counted based on the PDCCH subframes in DL reference configuration. For example, as shown in FIG. 7, eNB configures TDD configuration #1 as DL reference configuration. eNB changes the actual TDD configuration from #0, to #6 to #1 according to the DL/UL traffic ratio. Instead of counting PDCCH subframes in actual TDD configuration, the onDurationTimer, drx-InactivityTimer, and drx-RetransmissionTimer are counted based on the PDCCH subframes in the DL reference configuration, i.e., TDD configuration #1. PDCCH subframe counting based on DL reference configuration can avoid the potential misalignment PDCCH subframe counting between eNB and UE when TDD configuration changes.

In this case, the HARQ RTT timer per DL HARQ process should also count according to the DL reference configuration. For example, in FIG. 7, the HARQ feedback timing and HARQ RTT timer setting in a subframe where the PDCCH indicates a DL transmission or a DL assignment has been configured of TDD configurations #0, 6, or 1 should follow Table 3 below based on DL reference configuration, i.e., TDD configuration #1.

TABLE 3

| | k/HARQ RTT timers (k + 4) | | | | | | | | | |
|---|---|---|---|---|---|---|---|---|---|---|
| Uplink-downlink | Subframe number | | | | | | | | | |
| Configuration | 0 | 1 | 2 | 3 | 4 | 5 | 6 | 7 | 8 | 9 |
| 1 | 7/11 | 6/10 | | | 4/8 | 7/11 | 6/10 | | | 4/8 |

One of the benefits of DL reference configuration is that the DL reference configuration is changed semi-statically, which may be changed much less frequently as compared with the actual TDD configuration. On the other hand, the PDCCH subframes in actual TDD configuration may be less than the PDCCH subframes in DL reference configuration. In other words, the PDCCH scheduling may be with less opportunity in actual TDD configuration if counting is based on the DL reference configuration. However, eNB may compensate this effect by configuring larger onDurationTimer, drx-InactivityTimer and drx-RetransmissionTimer.

Figure 8:
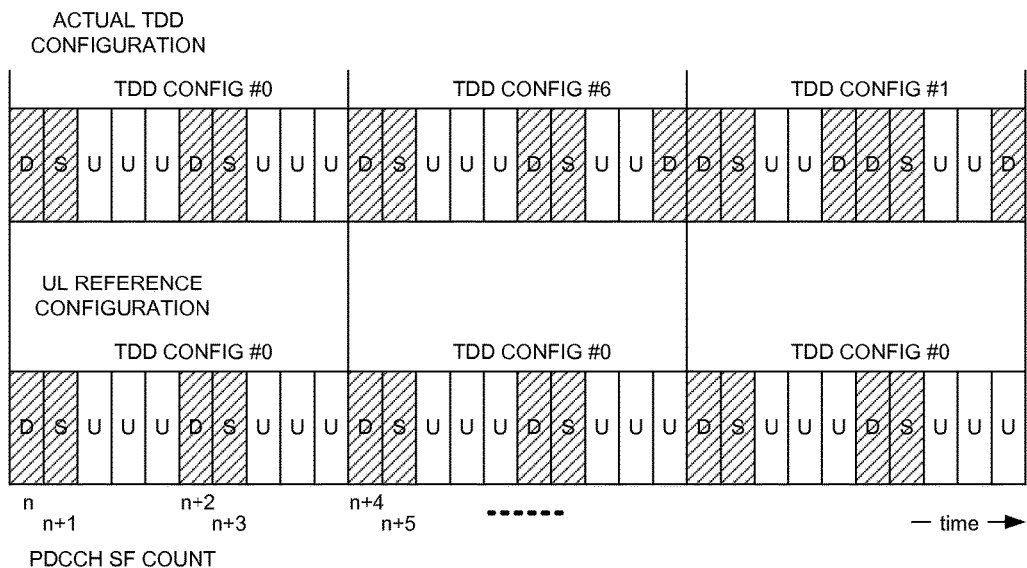
FIG. 8 illustrates an example of uplink (UL) reference configuration.

FIG. 8 illustrates an example of UL reference configuration. To prevent the actual PDCCH scheduling opportunity is less than the PDCCH subframe counting in the DL reference configuration, the UL reference configuration can be used as the reference configuration of PDCCH subframe counting. As shown in FIG. 8, eNB configures TDD configuration #0 as the UL reference configuration. eNB changes the actual TDD configuration from #0, to #6 to #1 according to the DL/UL traffic ratio. Instead of counting PDCCH subframes in actual TDD configuration, the onDurationTimer, drx-InactivityTimer, and drx-RetransmissionTimer are counted based on the PDCCH subframes in the UL reference configuration, i.e., TDD configuration #0. PDCCH subframe counting based on the UL reference configuration can avoid the potential misalignment PDCCH subframe counting between eNB and UE when TDD configuration changes. Besides, UE may monitor more PDCCH subframe in the actual TDD configuration than the PDCCH subframe counting in the UL reference configuration so that the PDCCH scheduling opportunity for UE may be more than the PDCCH subframe in the UL reference configuration. In this case, the counting on HARQ RTT timer, which determines the minimal DL data transmission and the retransmission period, should still follow the DL reference configuration.

In a third scenario, PDCCH subframe counting is based on a reference configuration broadcasted in SIB1. In the current mechanism, UE knows the operating TDD configuration from SIB1 so that the PDCCH subframe counting and HARQ RTT timer counting may be based on the SIB1 configuration in one novel aspect. In adaptive TDD systems, if a UE does not know the actual TDD configuration or the reference configurations, e.g., the legacy UE, or the system does not signal actual TDD configuration or reference configurations to the UE, the UE should count PDCCH subframe based on the TDD configuration broadcasted in the SIB1. The HARQ RTT timer setting should also follow the setting of the TDD configuration in SIB1. eNB should know which UE or UEs count PDCCH subframe in TDD configuration in SIB1, which can be known from the UE capability report. In one preferred embodiment, an UL reference TDD configuration is broadcasted in SIB1, which will be used as the reference TDD configuration for DRX timer counting.

In a fourth scenario, DRX timers are counted in subframe basis instead of PDCCH subframe basis. To prevent the ambiguity in PDCCH subframe counting, one simple way is to change the counting on onDurationTimer, drx-InactivityTimer, and drx-RetransmissionTimer to subframe basis. In this case, no matter what kind of TDD configuration and reference configurations are configured, both eNB and UE can count these timers in a synchronized way. However, eNB may need to configure different timer values for different TDD configurations to guarantee a UE monitors long enough PDCCH scheduling opportunities. In this case, the HARQ RTT timer can refer to the TDD configuration broadcasted in SIB1.

With DRX operation in adaptive TDD systems, it is important for UE to be able to synchronize its DRX operation with eNB. In general, eNB can send DRX MAC control element to stop onDurationTimer and drx-InactivityTimer at UE side. If the UE is not waiting for the DL retransmission (i.e., drx-RetransmissionTimer is not running), then the UE will enter inactive state. However, there is no channel for UE to synchronize with eNB. In accordance with one novel aspect, a DRX status report can be designed for a UE to send its DRX status to eNB to synchronize its DRX operations with eNB. For example, the values of current or the left DRX timers, including onDurationTimer, drx-InactivityTimer and/or drx-RetransmissionTimer can be sent from UE to eNB. The message can be sent through MAC control element. The message can be configured as periodic report or aperiodic report. The aperiodic report can be triggered by eNB or when a UE cannot successfully decode the PDCCH indication that indicates TDD configuration change.

Figure 9:
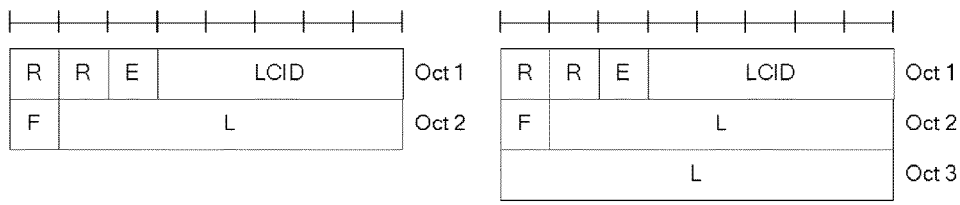
FIG. 9 shows an example of MAC PDU sub-header format with one reserved DRX status report.

FIG. 9 shows an example of DRX Status Report MAC Control Element and MAC PDU sub-header format with one reserved DRX status report. The current values or the remaining values of onDurationTimer, drx-InactivityTimer, and drx-RetransmissionTimer can be reported in the MAC control element. Since the maximum values of onDurationTimer, drx-InactivityTimer, and drx-RetransmissionTimer are 200, 2560 and 33 psf (PDCCH subframe), respectively, the bits to capture three timers should be 8, 12 and 6 bits, respectively.

Figure 10:
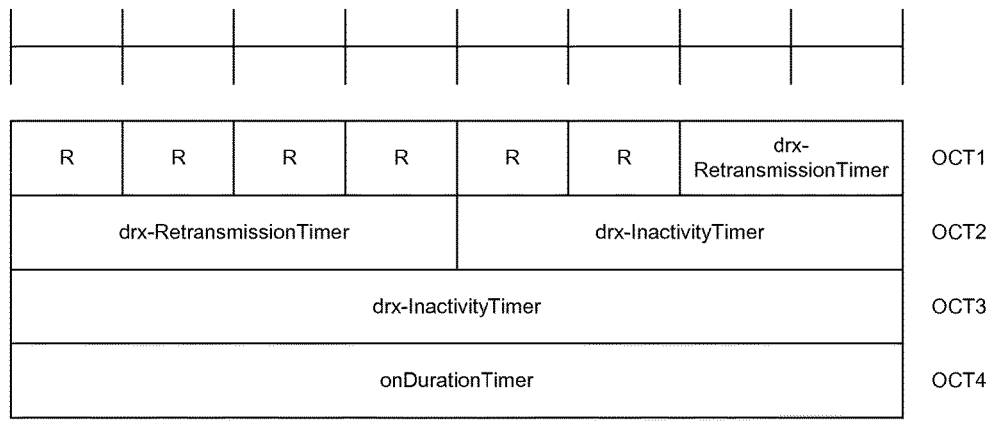
FIG. 10 shows an example of six reserved bits left in the first Octet used to capture DRX timer values.

FIG. 10 shows an example of six reserved bits left in the first Octet of a MAC PDU used to capture DRX timer values. The bit arrangement to capture these three timers is not necessary in this order. Any sequence to capture these three DRX timers is acceptable.

Figure 11:
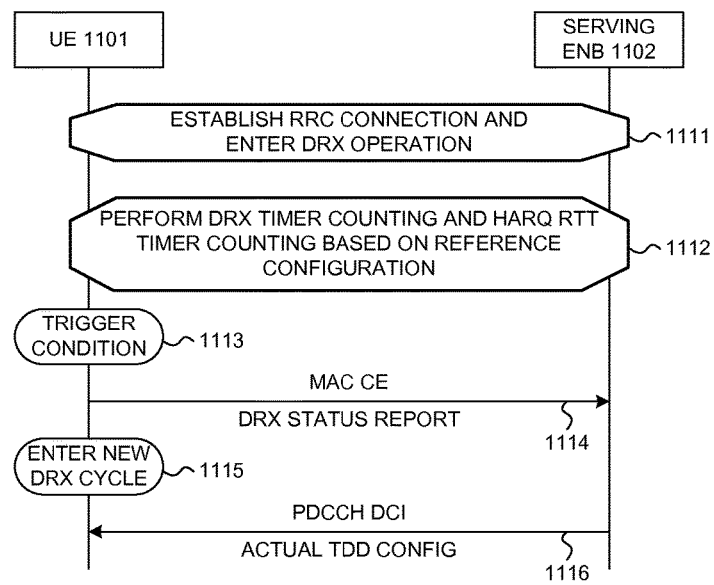
FIG. 11 illustrates a method of sending DRX status report in accordance with one novel aspect.

FIG. 11 illustrates a method of sending DRX status report in accordance with one novel aspect. In step 1111, UE 1101 establishes an RRC connection with eNB 1102 and enters DRX operation in an adaptive TDD system. In step 1112, the UE performs DRX timer counting and HARQ RTT timer counting based on reference TDD configurations. In step 1113, UE determines whether a triggering condition for DRX status report has been met. UE 1101 may be configured to send the report periodically. UE 1101 may also be configured to send the report a periodically. The aperiodic report can be trigger by eNB or when the UE cannot successfully decode the PDCCH indication that indicates TDD configuration change. In step 1114, UE 1101 send the DRX status report to eNB 1102.

The DRX status in UE and eNB may be out-of-sync. eNB can know the DRX status from UE's DRX status report and can use DRX MAC CE to force UE to enter an inactive state. However, when UE enters a new DRX cycle, it should have the knowledge of the actual TDD configuration. When eNB knows that a UE's DRX status is un-synchronized with that in its side, eNB should indicate the actual TDD configuration to the UE in the first subframe with PDCCH opportunity when the UE enter a new DRX cycle. In step 1115, UE 1101 enters a new DRX cycle. In step 1116, eNB 1102 sends the actual TDD configuration via PDCCH DCI. The TDD configuration can be sent via PDCCH DCI in UE specified search space. In one example, at least three bits indicating TDD configuration should be added in PDCCH DCI.

Assume that an eNB operates in inter-band carrier aggregation mode. If the eNB configures multiple carriers to a UE, and at least one carrier is active and operates in non-adaptive TDD mode and at least one carrier is active and operates in adaptive TDD mode, then the PDCCH subframes used for DRX timers counting should be counted in the union of PDCCH subframes of all active serving cells in non-adaptive TDD mode and the PDCCH subframes mentioned in the adaptive TDD mode.

Figure 12:
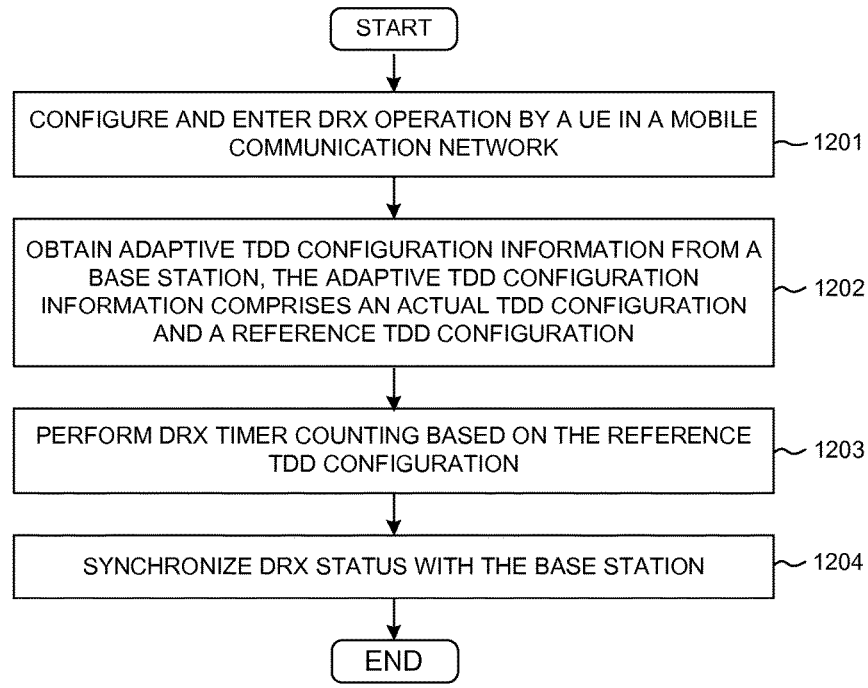
FIG. 12 is a flow chart of a method of DRX operation enhancement in adaptive TDD systems in accordance with one novel aspect.

FIG. 12 is a flow chart of a method of DRX operation enhancement in adaptive TDD systems in accordance with one novel aspect. In step 1201, a UE configures and enters DRX operation in an LTE/LTE-A mobile communication network. In step 1202, the UE obtains adaptive TDD configuration information from a base station. The adaptive TDD configuration information comprises an actual TDD configuration and a reference TDD configuration. In step 1203, the UE performs DRX timer counting based on the reference TDD configuration. In step 1204, the UE synchronizes DRX status with the base station. With the reference TDD configuration, it can avoid the potential misunderstanding between eNB and UE regarding DRX and HARQ timing when TDD configuration changes.

Figure 13:
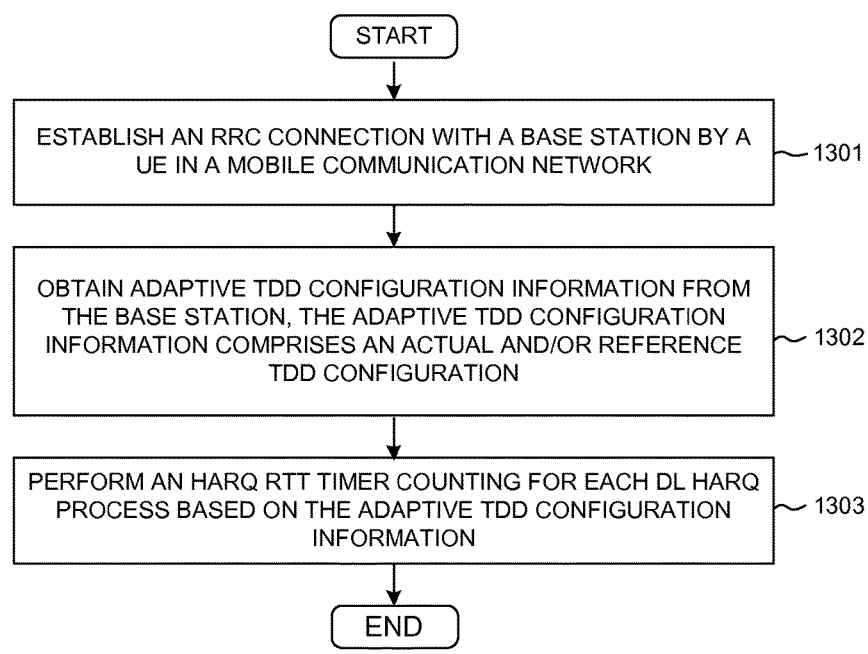
FIG. 13 is a flow chart of a method of HARQ operation enhancement in adaptive TDD systems in accordance with one novel aspect.

FIG. 13 is a flow chart of a method of HARQ operation enhancement in adaptive TDD systems in accordance with one novel aspect. In step 1301, a UE establishes a radio resource control (RRC) connection with a base station in an LTE/LTE-A mobile communication network. In step 1302, the UE obtains adaptive TDD configuration information from a base station. The adaptive TDD configuration information comprises an actual TDD configuration and/or a reference TDD configuration. In step 1303, the UE performs HARQ RTT timer counting based on the adaptive TDD configuration information. The UE can avoid the potential misunderstanding between eNB and UE regarding HARQ timing when TDD configuration changes.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    (a) configuring and entering discontinuous reception (DRX) operation by a user equipment (UE) in a mobile communication network;
    (b) obtaining adaptive time division duplex (TDD) configuration information from a base station, wherein the adaptive TDD configuration information comprises an actual TDD configuration and a reference TDD configuration;
    (c) performing DRX timer counting based on the reference TDD configuration when the UE does not know the actual TDD configuration, wherein the reference TDD configuration is either an uplink reference configuration or a downlink reference configuration configured by the base station through system information or radio resource control (RRC) signaling; and
    (d) synchronizing DRX status with the base station, wherein the UE sends a DRX status report to synchronize the DRX operation with the base station via an aperiodic media access control (MAC) control element (CE), and wherein the aperiodic MAC CE is triggered when the UE fails to decode a TDD configuration change.

2. The method of claim 1, wherein the obtaining in (b) involves obtaining a TDD configuration from broadcasted system information block.

3. The method of claim 1, wherein the obtaining in (b) involves obtaining a TDD configuration from dedicated signaling.

4. The method of claim 1, wherein the reference TDD configuration comprises the uplink (UL) reference configuration, and wherein the UL reference configuration is with the most number of schedulable UL subframes among all TDD configurations defined in the mobile communication network.

5. The method of claim 1, wherein the reference TDD configuration comprises the downlink (DL) reference configuration, and wherein the DL reference configuration is with the most number of schedulable DL subframes among all TDD configurations defined in the mobile communication network.

6. The method of claim 1, wherein the performing in (c) involves counting onDurationTimer, drx-InactivityTimer, and drx-RetransmissionTimer by Physical Downlink Control Channel (PDCCH) subframes of the reference TDD configuration.

7. The method of claim 1, further comprising:
    performing hybrid automatic repeat request (HARQ) round trip time (RTT) timer counting by counting an HARQ RTT timer per downlink (DL) HARQ process according to the reference TDD configuration.

8. The method of claim 1, wherein the synchronizing in (d) involves:
    obtaining the actual TDD configuration in the first subframe with physical downlink control channel (PDCCH) opportunity when the UE enters a new DRX cycle.

9. The method of claim 1, wherein the DRX status report contains values of current or left DRX timers including at least one of an onDurationTimer, a drx-InactivityTimer, and a drx-RetransmissionTimer.

10. The method of claim 8, wherein the UE obtains the actual TDD configuration via monitoring a PDCCH downlink control information (DCI) in a UE-specific search space.

11. A user equipment (UE), comprising:
    a discontinuous reception (DRX) configuration module that configures DRX operation for the UE in a mobile communication network;
    an adaptive time division duplex (TDD) module that obtains adaptive TDD configuration information from a base station, wherein the adaptive TDD configuration information comprises an actual TDD configuration and a reference TDD configuration;
    a DRX operation module that performs DRX timer counting based on the reference TDD configuration when the UE does not know the actual TDD configuration, wherein the reference TDD configuration is either an uplink reference configuration or a downlink reference configuration configured by the base station through system information or radio resource control (RRC) signaling; and
    a synchronization module that synchronizes DRX status with the base station, wherein the UE sends a DRX status report to synchronize the DRX operation with the base station via an aperiodic media access control (MAC) control element (CE), and wherein the aperiodic MAC CE is triggered when the UE fails to decode a TDD configuration change.

12. The UE of claim 11, wherein the UE obtains a TDD configuration from broadcasted system information block.

13. The UE of claim 11, wherein the UE obtains a TDD configuration from dedicated signaling.

14. The UE of claim 11, wherein the reference TDD configuration comprises the uplink (UL) reference configuration, and wherein the UL reference configuration is with the most number of schedulable UL subframes among all TDD configurations defined in the mobile communication network.

15. The UE of claim 11, wherein the reference TDD configuration comprises the downlink (DL) reference configuration, and wherein the DL reference configuration is with the most number of schedulable DL subframes among all TDD configurations defined in the mobile communication network.

16. The UE of claim 11, wherein the UE performs DRX timer counting via counting onDurationTimer, drx-InactivityTimer, and drx-RetransmissionTimer by Physical Downlink Control Channel (PDCCH) subframes of the reference TDD configuration.

17. The UE of claim 11, further comprising:
    performing hybrid automatic repeat request (HARQ) round trip time (RTT) timer counting by counting an HARQ RTT timer per downlink (DL) HARQ process according to the reference TDD configuration.

18. The UE of claim 11, wherein the UE obtains the actual TDD configuration in the first subframe with physical downlink control channel (PDCCH) opportunity when the UE enters a new DRX cycle.

19. The method of claim 11, wherein the DRX status report contains values of current or left DRX timers including at least one of an onDurationTimer, a drx-Inactivity-Timer, and a drx-RetransmissionTimer.

20. The method of claim 18, wherein the UE obtains the actual TDD configuration via monitoring a PDCCH downlink control information (DCI) in a UE-specific search space.

* * * * *

UNITED STATES PATENT AND TRADEMARK OFFICE
CERTIFICATE OF CORRECTION

PATENT NO. : 10,057,018 B2  
APPLICATION NO. : 14/870207  
DATED : August 21, 2018  
INVENTOR(S) : Shiang-Jiun Lin et al.

Page 1 of 1

It is certified that error appears in the above-identified patent and that said Letters Patent is hereby corrected as shown below:

On the Title Page

Item (63) information "CHINA PCT/CN2013/080904 filed on Aug. 06, 2013" was missing. The text should now read:
"continuation of application NO. PCT/CN2014/083714 filed on Aug. 05, 2014, PCT/CN2014/083714 claims benefit from the international application NO. PCT/CN2013/080904 filed on Aug. 06, 2013"

Signed and Sealed this  
Sixth Day of November, 2018

Andrei Iancu  
*Director of the United States Patent and Trademark Office*